Jan. 1, 1929.

E. W. SEAHOLM 1,697,784

AXLE ASSEMBLY

Filed Oct. 11, 1923

Inventor
Ernest W. Seaholm
By his Attorneys
Blackmore, Spencer & Flint

Patented Jan. 1, 1929.

1,697,784

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

AXLE ASSEMBLY.

Application filed October 11, 1923. Serial No. 667,957.

This invention relates to automobiles, and is illustrated as embodied in a front axle assembly.

An object of the invention is to provide such an assembly with means for lubricating the various relatively movable parts with a minimum of effort. From this point of view, the invention contemplates the lubrication of the wheel bearings by the provision of a passage extending through the wheel spindle and through which lubricant can be fed from a fitting adjacent the base of the spindle. Preferably, the wheel is supported by a pair of axially-spaced anti-friction bearings and the described lubricant passage opens between these bearings.

The invention is also applicable to front wheel mountings, in which case the knuckle is connected to the upper and lower arms of a bifurcated front axle by means of a hollow king pin which may, if desired, be plugged at its upper end and which is provided with means for introducing lubricant in its side to be fed through the king pin to an anti-friction bearing between the king pin and the lower arm of the axle.

Other features of the invention relate to lubricated ball-and-socket joints between a drag link and the steering arms connected to the opposite knuckles of the front wheels; to an arrangement for retaining lubricant in the upper and lower bearings of a king pin of the form described; and to other desirable features of construction and novel combinations of particular parts which will be apparent from the following description of the illustrative embodiment shown in the accompanying drawings, in which Fig. 1 is a view partly in transverse vertical section through a front wheel and its knuckle and part of the front axle;

Figures 1, 2, 3:
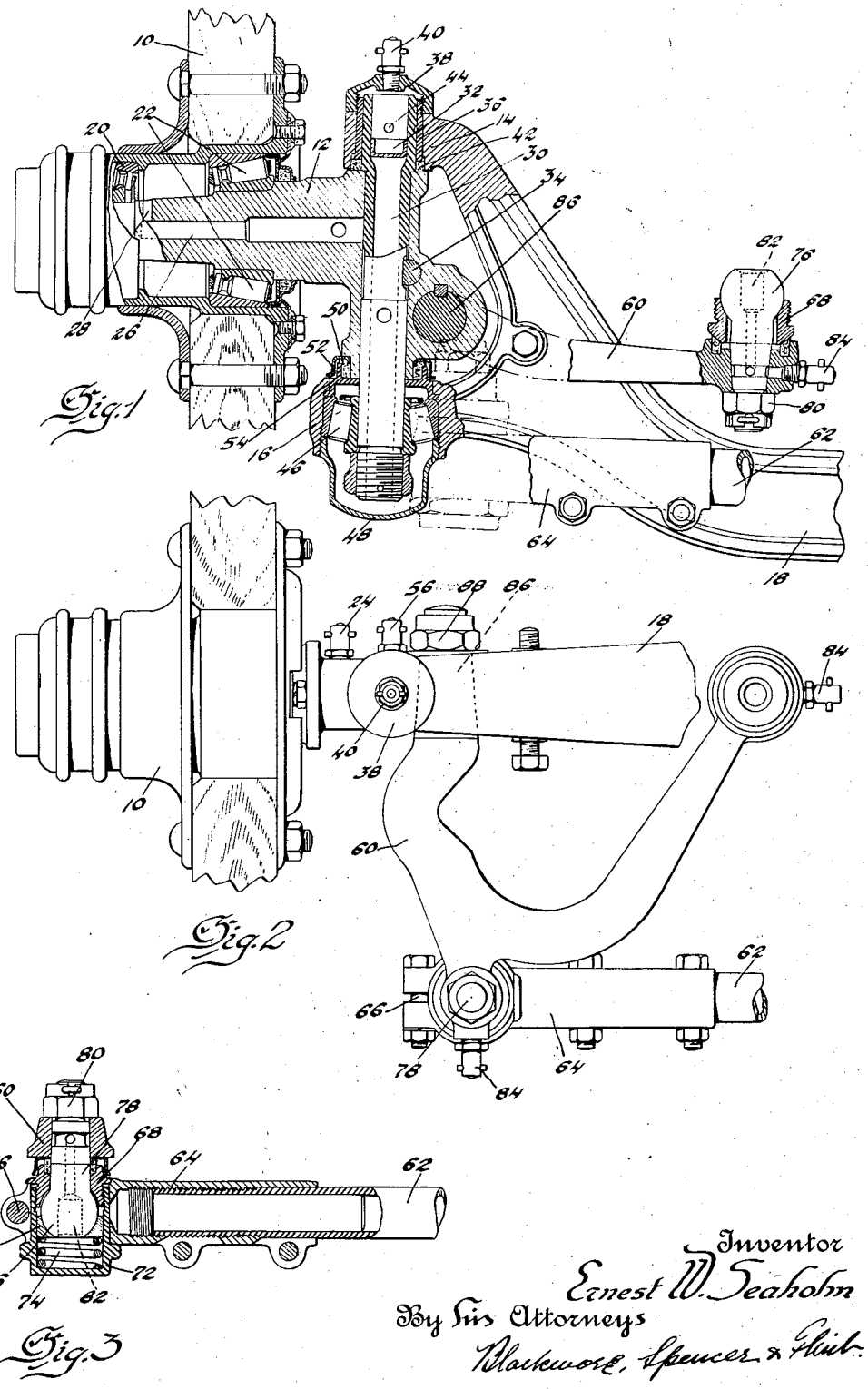
Fig. 2 is a top plan view of the parts shown in Fig. 1.
Fig. 3 is a view in a horizontal plane in section through the novel joint between the drag link and the steering arm.

In the arrangement selected for illustration, the front wheel 10 is supported on a knuckle 12 having a portion extending between the upper arm 14 and the lower arm 16 of a front axle 18. The wheel is supported on the spindle by anti-friction bearings 20 and 22 axially-spaced on the spindle 12 and which, according to one feature of the present invention, are lubricated by lubricant introduced through a fitting 24 at the base of the spindle 12 into a passage 26 in the spindle which opens at 28 between the bearings. This permits of easily lubricating the wheel bearings without removing the wheel or otherwise disturbing the adjustment of the various parts.

According to another feature of the invention, the knuckle 12 and the arms 14 and 16 are connected by a hollow king pin 30, which is shown as closed near its top by a plug 32 and which is connected to the knuckle 12 to move therewith by a cross-key 34. At its upper end, the king pin is journaled in a bushing 36 to which is threaded a cap 38 carrying a fitting 40 through which lubricant may be introduced. If desired, a packing 42 may be provided between the bushing 36 and the top surface of the knuckle 12. By this arrangement, lubricant introduced through the fitting 40 is retained in the upper end of the hollow king pin 30 and is fed through openings 44 to the adjacent surfaces of the upper end of the king pin and the bushing 36.

Between the lower end of the king pin and the arm 16 of the axle there is preferably provided an anti-friction thrust bearing 46. In order to inclose this bearing and the lower end of the king pin 30, a lubricant-tight cap 48 is threaded to be screwed into the opening in the arm 16, and packing 50 is compressed between a flanged washer or equivalent member 52 engaging the lower surface of the knuckle 12 and a member such as a bushing 54 seated in the arm 16 and having an upwardly extending flange inclosed by the flange of the member 52. Lubricant may be introduced into the hollow king pin through a fitting 56 and is fed through the king pin into the cap 48 and to the bearing 46.

The knuckle is provided with a steering arm 60 of usual form, which is connected to the arm 60 of the knuckle at the opposite side of the vehicle by a drag link 62 to which is clamped at each end a member 64 split at its end to be clamped by means of a clamp bolt 66 onto a cup member 72 containing a pair of cooperating half-socket members one of which, shown at 68, is threaded in the cup member, and the other of which, shown at 70, is slidably supported in the cup member 72 by a spring 74 which automatically takes up for wear and which allows a slight relative movement of the various parts. Embraced between the cooperating half-socket members 68 and 70 is a connecting device having a spherical head 76 from which a stem 78 extends upwardly through an opening in the steering arm 60 to which it is secured by a castellated nut 80. The connecting device is provided with a lubricant passage 82 which feeds lubricant from a fitting 84 through the spherical head 76 into the cup member 72 for the lubrication of the various parts. It will be noted that the half-socket member 70 has a central opening through which the lubricant may pass. As shown in Fig. 1, the steering arm 60 may also, if desired, be connected to the drag link from the steering column by a similar ball-and-socket joint. The arm 60 may have a conical end 86 (Fig. 2) keyed to the knuckle 12 and held by a clamping nut 88.

While one illustrative embodiment of my invention has been described, it is not my intention to limit its scope to that particular embodiment or otherwise than by the terms of the appended claims.

I claim:

1. A front axle assembly comprising, in combination, an axle bifurcated at its end to provide upper and lower arms, a knuckle having a portion extending between said arms, a hollow king pin keyed to the knuckle and connecting the axle and knuckle and having a bearing in the upper arm of the axle, an anti-friction bearing between the lower end of the king pin and the lower arm of the axle, a lubricant-tight cap over the lower end of the king pin inclosing said bearing, a plug in the upper end of the king pin, means for introducing lubricant into the hollow king pin to be fed thereby into the cap for lubricating the anti-friction bearing, a cap carried by the upper arm of the axle and inclosing the upper end of the king pin, and means for introducing lubricant into the upper cap for lubricating the bearing between the upper arm of the axle and said king pin.

2. A front axle assembly comprising, in combination, a front axle which is bifurcated at its end to provide upper and lower arms, a knuckle having a portion extending between said arms, a king pin connecting the knuckle and said arms, an anti-friction bearing between the lower end of the king pin and the lower arm of the axle, a cap threaded in the lower arm of the axle and inclosing the lower end of the king pin and the lower side of said bearing to retain lubricant, and a packing between the knuckle and the upper face of the lower arm of the axle including a member carried by the axle arm and which has an upwardly extending flange and a member engaging the lower face of the knuckle and which has a downwardly extending flange inclosing the first mentioned flange and packing material compressed between said members inside of said flanges.

In testimony whereof I affix my signature.

ERNEST W. SEAHOLM.